(12) United States Patent
D'Souza et al.

(10) Patent No.: US 7,190,671 B2
(45) Date of Patent: Mar. 13, 2007

(54) MITIGATING DENIAL-OF-SERVICE ATTACKS USING FREQUENCY DOMAIN TECHNIQUES

(75) Inventors: Scott D'Souza, Ottawa (CA); Paul Kierstead, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 1108 days.

(21) Appl. No.: 10/224,506

(22) Filed: Aug. 21, 2002

(65) Prior Publication Data

US 2004/0037326 A1   Feb. 26, 2004

(51) Int. Cl.
  *H04J 3/14*   (2006.01)
  *H04L 9/32*   (2006.01)
(52) U.S. Cl. .................. 370/232; 370/230.1; 370/235; 726/23
(58) Field of Classification Search ...................... None
  See application file for complete search history.

(56) References Cited

U.S. PATENT DOCUMENTS

2002/0083175 A1   6/2002   Afek et al.

OTHER PUBLICATIONS

"Analysis of a Denial of Service Attack on TCP", Schuba et al., Coast Laboratory, Purdue University, 1997 IEEE, pp. 208-223.

*Primary Examiner*—Chi Pham
*Assistant Examiner*—Ronald Abelson
(74) *Attorney, Agent, or Firm*—Marks & Clerk; S. Mark Budd

(57) ABSTRACT

Methods and apparatus for mitigating denial of service attacks in a communications network are described. Frequency domain techniques such as Fourier Transform are used to detect packet flooding in which a frequency spectrum reveals a periodic pattern to the attack packets. A pulse generator is used to create pulses having the frequency and phase of the periodic pattern. New packets arriving simultaneously with the created pulses are dropped from the system and packets which are not synchronized with the pulse generator are passed through the system normally.

12 Claims, 4 Drawing Sheets

MITIGATING DENIAL-OF-SERVICE ATTACKS USING FREQUENCY DOMAIN TECHNIQUES

FIELD OF THE INVENTION

This invention relates to communications systems and more particularly to methods and apparatus for mitigating denial of service attacks in communications networks.

BACKGROUND

Attacks on web sites in recent years has resulted in severe disruption in network services. These attacks can take any one of a number of forms including, but not limited to, SYN flooding.

In a SYN flooding attack an attacker overloads a victim's site to the point where it cannot cope with incoming traffic. Such an attack, typically, focuses on an inherent characteristic of TCP based services.

Essentially, TCP services rely on a three-way hand shaking protocol on connection set up. A client wishing to make connection with a host sends a synchronization signal (SYN) to the host and the host responds to the client with a SYN acknowledgement (ACK) reply. The client then returns an acknowledgement and the connection is established.

Upon completion of a connection the client forwards a finish (FIN) packet to the host indicating that there will be no further data or packets directed to the host and the connection is thereafter closed.

In a SYN flooding attack the attacker will typically use a false or invalid source address such that when the host returns the SYN/ACK message it does not reach a valid client. Under the TCP protocol the host stores half opened connections i.e. connections for which the third leg of the three way protocol has not been completed for a set period of time or until a system time out occurs. If, during this time interval multiple new half opened connections are established at the host site the memory allocated to retaining such connections becomes swamped and eventually is unable to receive any more SYN packets. At this stage the server or host will crash or will not respond to any new connections and the site goes out of service. Because the host is unable to receive further data the attacker has been successful in generating what is known as a denial of service attack.

Denial of service attacks have become an increasingly prevalent form of a security threat and the problem, so far, has been quite difficult to solve. Several countermeasures have been proposed and can be characterized as firewall and router filtering, operating system improvements, protocol improvements and intrusion detection.

A denial of service attack involves blocking somebody's ability to use some service on a network. Denial of Service (DoS) attacks are common across the Internet with many being launched daily at various targets. Many of the attacks involve specially constructed packets designed to either take advantage of flaws in software, or to tie up resources within devices (packet flooding attacks). In co-pending application bearing co-pending application Ser. No. 10/224507 a new method of detecting these packet floods using frequency analysis techniques is described. The contents of the aforementioned application are incorporated herein by reference.

Several attack mitigation solutions exist such as random drop algorithms and rate limiting. Random drop involves dropping packets from queues on a random basis when an attack has been detected. Schemes like this rely on the fact that real connections will spend very little time within queues compared to attack packets and therefore dropped packets from the queue are more likely to belong to an attack.

Rate limiting involves restricting the rate of a certain type of packet to a specified level given that an attack has been detected, by dropping packets which exceed this bandwidth.

Random drop algorithms can work quite well within network hosts, but within carrier equipment it becomes quite difficult to implement. Shadow state tables have to be created and these can become victim to the same attacks that are directed at a victim.

Rate limiting can be a very effective way to ensuring that a server does not become overloaded, but in the process good packets are dropped at the same time as attack packets, thus denying some legitimate users access to a service. A rate limiter is unable to distinguish good traffic from bad.

SUMMARY OF THE INVENTION

Using the method described in the aforementioned co-pending application one can determine that an attack is passing through a network device and, as well the frequency of that attack can be calculated. Once an attack is detected, the mitigation technique of the present invention is engaged. The technique can be implemented in hardware or software.

Therefore in accordance with a first aspect of the present invention there is provided a method of mitigating a packet flooding attack on a system in a communications network, the method comprising the steps of: a) producing, responsive to packets of a packet flooding attack arriving at the system at a detectable frequency, a pulsed signal of that frequency; b) aligning the phase of the pulsed signal with the arrival of the packets of the packet flooding attack; and c) dropping, from the system, packets that arrive during pulses of the pulsed signal.

In accordance with a second aspect of the invention there is provided an apparatus for mitigating a packet flooding attack on a system in a communications network, the apparatus comprising: means to produce, responsive to packets of a packet flooding attack arriving at the system at a detectable frequency, a pulsed signal of that frequency; means to align the phase of the pulsed signal with the arrival of the packets of the packet flooding attack; and means to drop, from the system, packets that arrive during pulses of the pulsed signal.

BRIEF DESCRIPTION OF THE DRAWINGS

The invention will now be described in greater detail with reference to the attached drawings wherein.

DETAILED DESCRIPTION OF THE INVENTION

Figure 1:
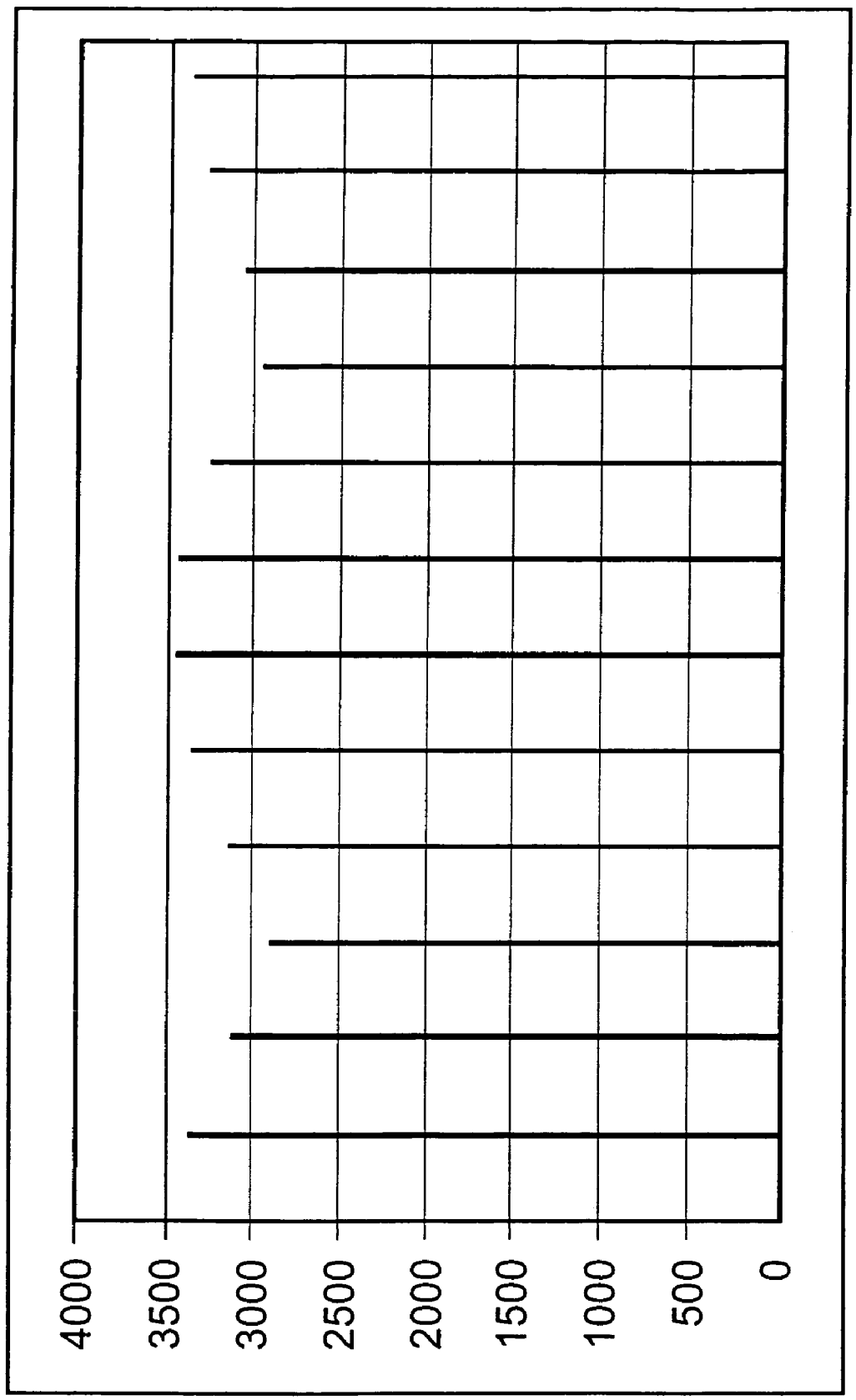
FIG. 1 illustrates a frequency spectrum indicating an attack condition.
Figure 2:
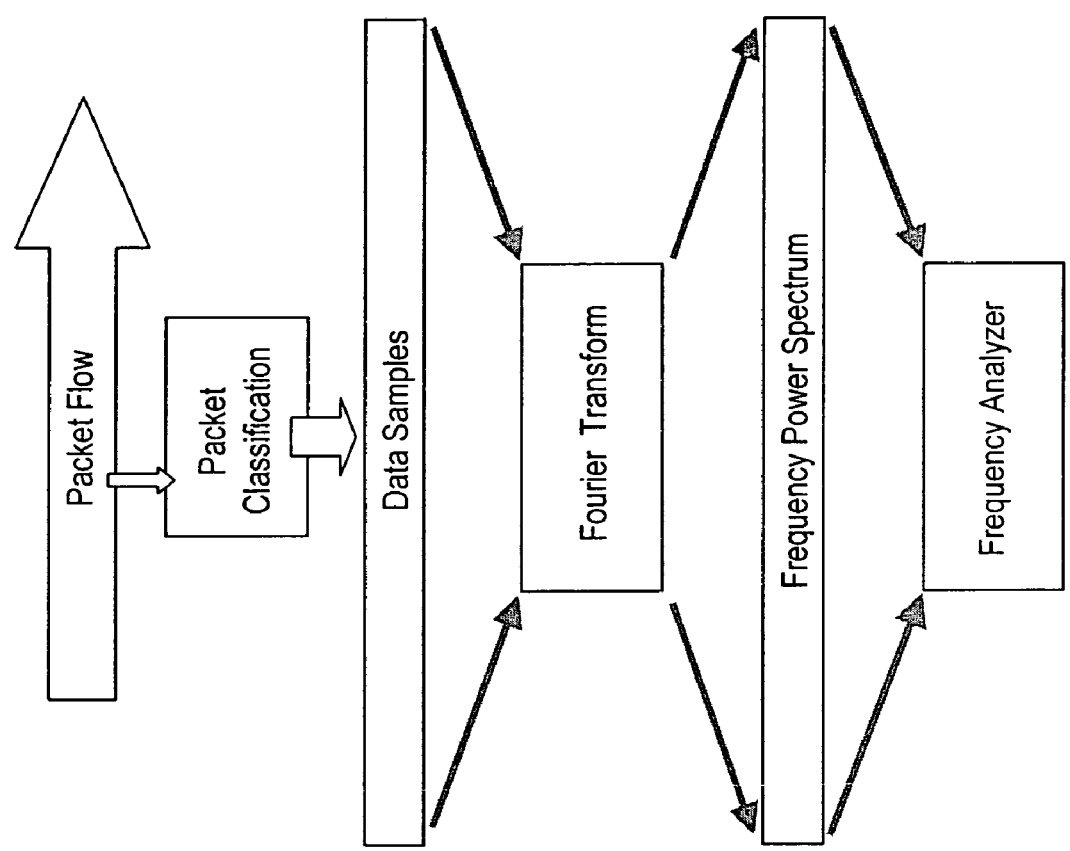
FIG. 2 is the block diagram of attack detection method as described in applicant's aforementioned co-pending application.

A method of detecting a denial of service attack using frequency domain analysis is described in the aforementioned, co-pending application. Using a Fourier transform an attack is indicated by a frequency spectrum which shows pulse power levels much higher than the average or power of legitimate traffic. FIG. 1 illustrates a frequency spectrum of an attack condition using Fourier transform. FIG. 2 is a block diagram of the detection process used to obtain the frequency spectrum of FIG. 1.

According to the present invention the detected attack condition is applied to a method of mitigating an attack. A pulse generator (or loop) is set to produce pulses at the same frequency as the attack that is detected. Thus, a pulse generator or loop is controlled to generate a frequency spectrum of the form illustrated in FIG. 1. It is then possible to determine the phase of the attack and hence it is possible to predict the time of the next attack packet. The phase offset of the generated pulses is aligned with the phase of the input sample from the last sample window. In this context a sample window is the arbitrary time period in which an input sample is gathered.

If a new packet arrives simultaneously, within a specified window, with an output pulse from the pulse generator, it is deemed to be an attack packet and dropped from the system. By dropping packets that are close in phase to the predicted attack packet the chances of dropping an attack packet are increased. Packets that are not near the prediction are allowed to pass through. Thus, by synchronizing the pulse generator to the frequency and phase of the packet flood as indicated by the frequency spectrum it can be determined that the incoming packets that collide with the pulses should be dropped and all others allowed to passed through.

Figure 3:
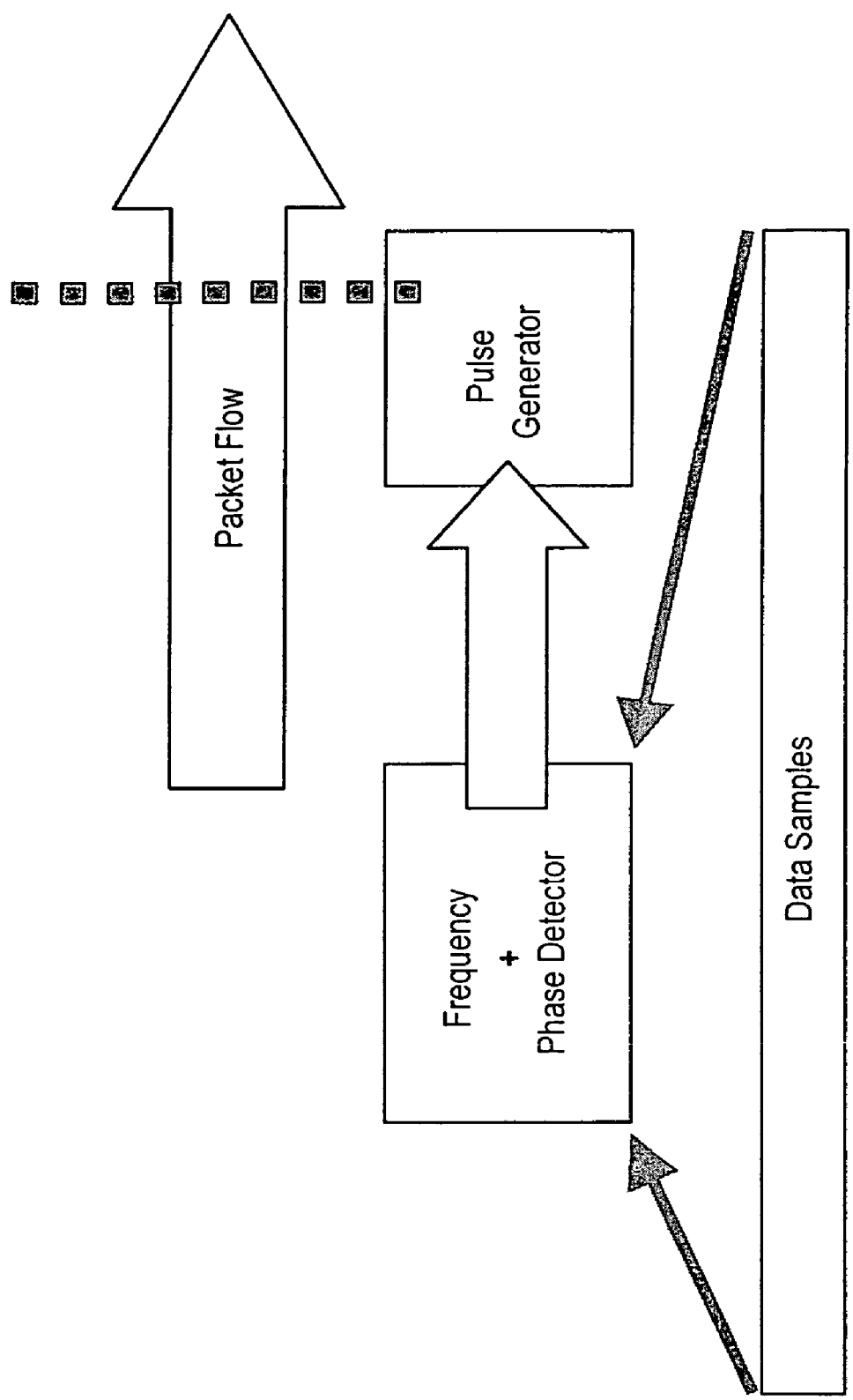
FIG. 3 is a block diagram of the attack mitigation process according to a first embodiment of the invention.
Figure 4:
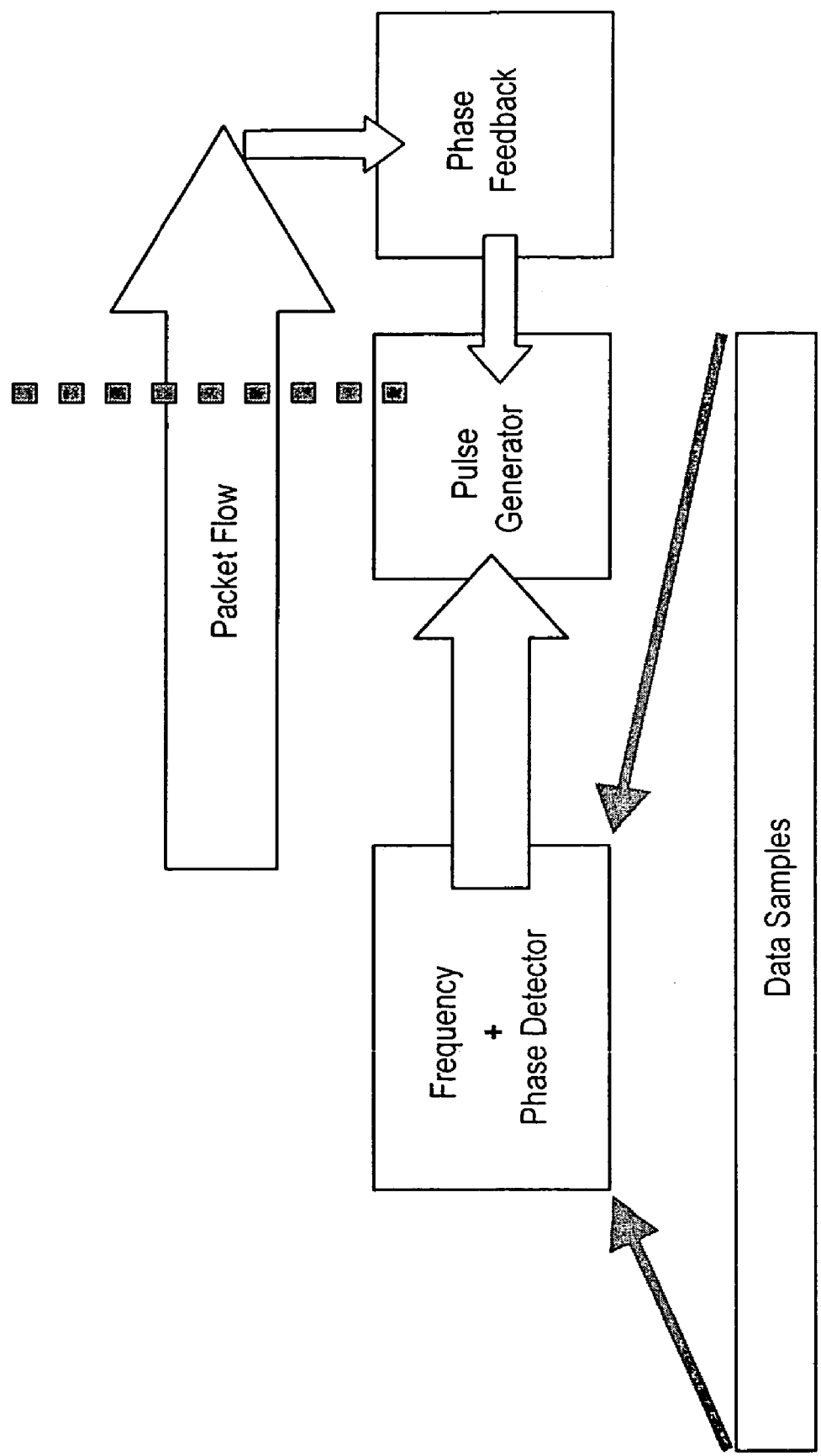
FIG. 4 is a block diagram of the attack mitigating process according to a second embodiment of the invention.

FIG. 3 is a block diagram of the mitigating process according to a first embodiment of the present invention. The phase of the pulses is only set at each sampling window and is maintained for the next window. It is possible that the phase may change slightly between windows and this may impact negatively on the mitigating process until the phase is reset. It is possible to combat this by adding a phase feedback loop into the system. The phase feedback loop helps to keep the pulse generator phase locked with the incoming attack packets. This embodiment is shown in the block diagram of FIG. 4

The solution described here has several advantages over the prior art solutions. Firstly, the algorithm can be implemented within any network device and is not limited to implementations within network hosts. The second and more important advantage of the method proposed is that some differentiation is made between "good" traffic and attacker traffic. Using this system, it is more probable that non-attacker packets will make it to their intended destination while attacker traffic is rejected.

The present invention relates to the sampling of any event with a regular interval. These include the packets such as SYN and ICMP.

The ability to detect and mitigate DoS attacks is of great value to operators of network services. DoS mitigation mechanisms may prove to be value-adding differentiators in the network equipment market.

While particular embodiments of the invention have been described and illustrated it will be apparent to one skilled in the art that numerous changes can be implemented without departing from the basic concept. It is to be understood, however, that such changes will fall within the full scope of the invention as defined by the appended claims.

We claim:

1. A method of mitigating a packet flooding attack on a system in a communications network, the method comprising the steps of:
   a) producing, responsive to packets of a packet flooding attack arriving at the system at a detectable frequency, a pulsed signal of that frequency;
   b) aligning the phase of the pulsed signal with the arrival of the packets of the packet flooding attack; and
   c) dropping, from the system, packets that arrive during pulses of the pulsed signal.

2. The method as defined in claim 1 wherein the step c) of dropping comprises dropping all packets that arrive during pulses of the pulsed signal.

3. The method as defined in claim 1 wherein the step c) of dropping comprises dropping only packets belonging to a predetermined group of packet types and that arrive during pulses of the pulsed signal.

4. The method as defined in claim 1 wherein the packets include repeated single packets with a recognizable signature.

5. The method as defined in claim 1 wherein the group of packet types includes Internet Protocol SYN and ICMP packet types.

6. The method as defined in claim 1 wherein the step b) of aligning comprises phase locking the pulsed signal to the arrival of packets of the packet flooding attack.

7. The method as defined in claim 2 wherein the step b) of aligning comprises phase locking the pulsed signal to the arrival of packets of the packet flooding attack.

8. The method as defined in claim 3 wherein the step b) of aligning comprises phase locking the pulsed signal to the arrival of packets of the packet flooding attack.

9. The method as defined in claim 4 wherein the step b) of aligning comprises phase locking the pulsed signal to the arrival of packets of the packet flooding attack.

10. An apparatus for mitigating a packet flooding attack on a system in a communications network, the apparatus comprising:
   means to produce, responsive to packets of a packet flooding attack arriving at the system at a detectable frequency, a pulsed signal of that frequency;
   means to align the phase of the pulsed signal with the arrival of the packets of the packet flooding attack; and
   means to drop, from the system, packets that arrive during pulses of the pulsed signal.

11. The apparatus as defined in claim 9 wherein the means to produce a pulsed signal is a pulse generator.

12. The apparatus as defined in claim 9 wherein a phase lock loop is used to control dropping of the packets.

* * * * *